Patented Feb. 26, 1929.

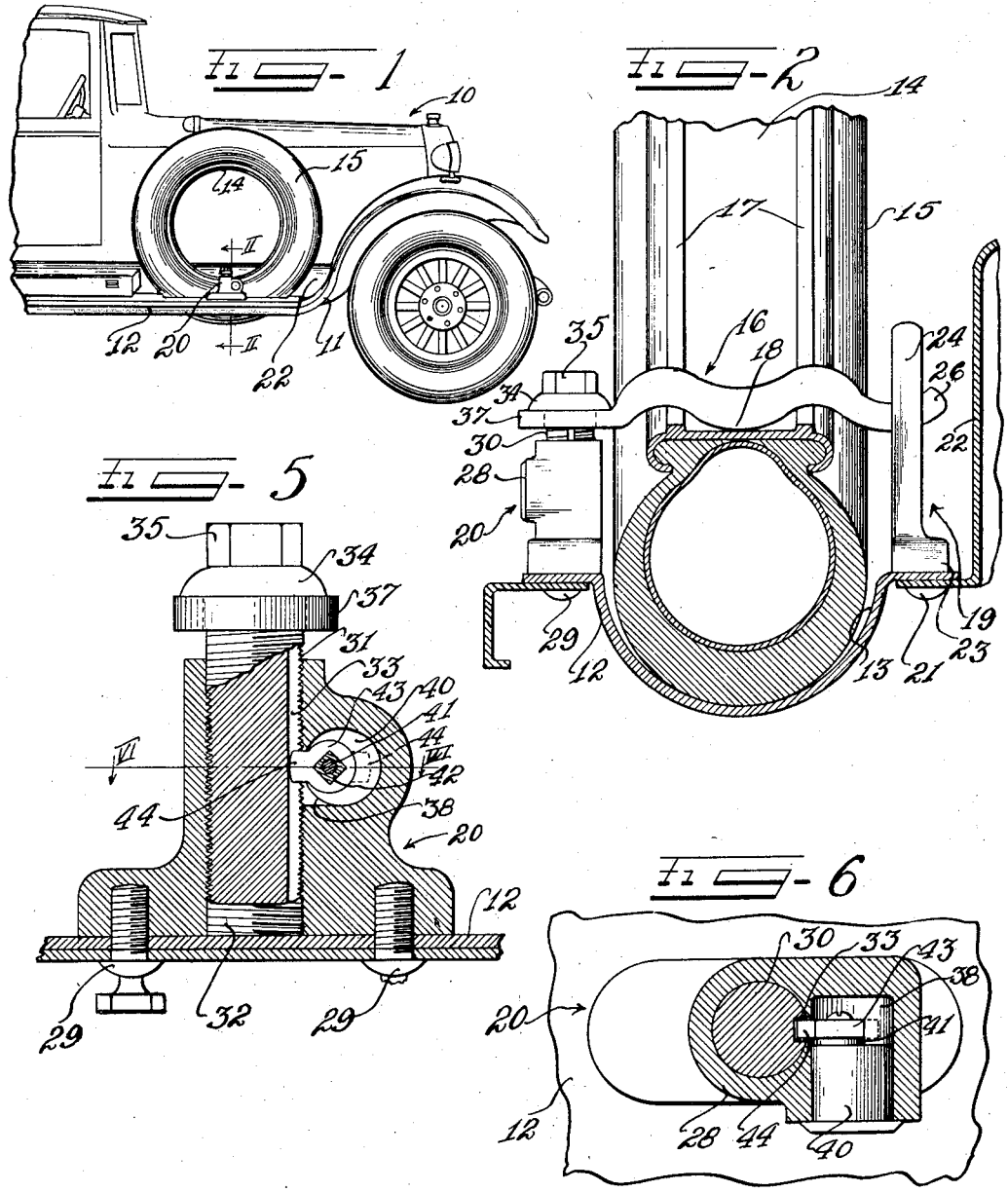

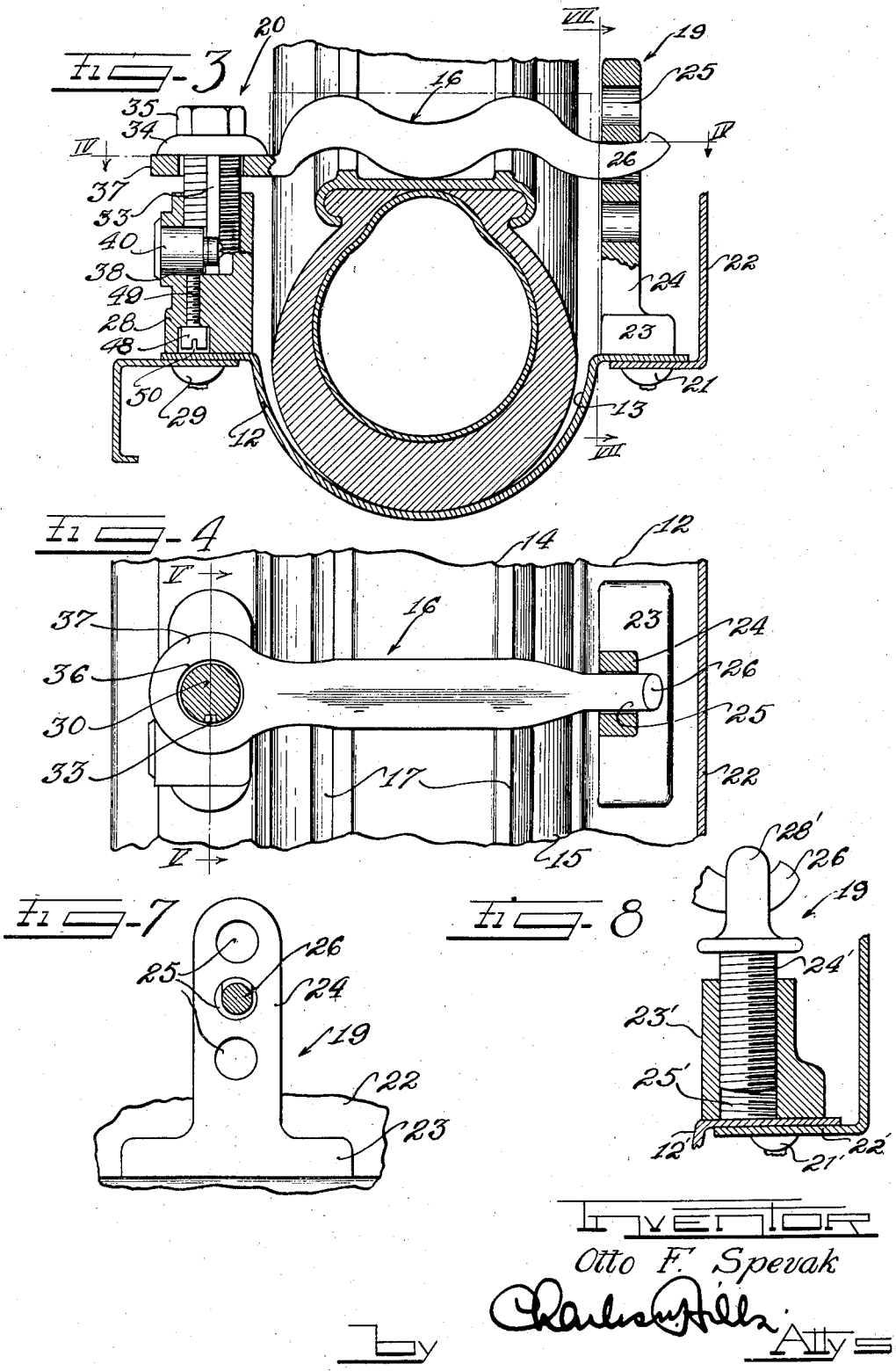

1,703,370

UNITED STATES PATENT OFFICE.

OTTO F. SPEVAK, OF CHICAGO, ILLINOIS.

SPARE-TIRE LOCK.

Application filed October 17, 1927. Serial No. 226,594.

My invention relates in general to spare tire locks, and more particularly to an improved spare tire lock construction adapted to be carried upon one of the forward fenders or running boards of the vehicle to secure a spare tire in a depression in the fender or running board.

An object of my invention is to provide an improved spare tire lock adjustable to different sizes of tires, and adapted to be locked in any one of a plurality of positions through the means of a conventional key operated lock.

Another object of my invention is to provide an improved tire lock construction adapted to secure a spare tire to one of the forward fenders or running boards of a motor vehicle, of simple and inexpensive construction, and capable of ready attachment to the fender or running board.

Other objects and advantages of my invention will more fully appear from the following detailed description taken in connection with the accompanying drawings, which illustrate several embodiments thereof and in which:

Figure 1 is a fragmentary elevation of the forward part of a motor vehicle showing my novel lock applied to the spare tire carried by one of the running boards;

Figure 2 is an enlarged fragmentary sectional view taken on substantially the line II—II of Figure 1 looking in the direction indicated by the arrows and showing the lock structure in elevation;

Figure 3 is an enlarged fragmentary sectional view similar to Figure 2 and showing the supports for the tire retaining member in section;

Figure 4 is a fragmentary view partly in section taken on the line IV—IV of Figure 3 looking downwardly;

Figure 5 is an enlarged fragmentary sectional view illustrating in detail the construction of the lockable support member and taken on substantially the line V—V of Figure 4 looking in the direction indicated by the arrows;

Figure 6 is a fragmentary horizontal sectional view taken on substantially the line VI—VI of Figure 5 looking downwardly;

Figure 7 is a fragmentary vertical view partly in section taken on substantially the line VII—VII of Figure 3 looking in the direction indicated by the arrows and showing the construction of the fixed support member, and Figure 8 is a fragmentary sectional view of a modified form of support for the tire retaining member adapted to take the place of the fixed support shown in Figure 7.

In the drawings:

Like reference characters designate similar parts throughout the several views.

The reference character 10 designates generally a motor vehicle including a front fender 11 and a running board 12 connected to the fender. The running board 12 has a depression or recess 13 formed therein adapted to serve as a pocket for accommodating the lower portion of a spare tire 15. That is to say, the lower portion of the spare tire 15 is adapted to be seated in the depression 13. Of course, it is to be understood that this depression, as is well known in the art, might equally well be formed in the front fender 11 without deviating from the features of this invention.

This spare tire 15 includes a conventional rim 14 adapted to be engaged by a tire retaining member 16 comprising part of my novel lock structure. Attention is directed to the fact that the tire rim 14 includes parallel annular flanges or projections 17 formed on its inner face. The tire retaining member 16 is formed with an intermediate projecting portion 18 adapted to engage the inner face of the tire rim 14 between the flanges 17, as is evident from Figures 2 and 3. Thus, it will be apparent that this member 16 is formed on each end so as to clear the flanges or projections 17. The ends of the member 16 are cooperable with novel supports 19 and 20 which comprise the other parts of my lock construction. The construction of each of these supports will now be described in detail.

The support 19 is secured to the running board 12 by means of a bolt 21. This support is disposed in a vertical position adjacent the running board apron 22 of the motor vehicle 10. The support 19 includes a horizontal flange 23 through which the bolt 21 extends, and a vertical element 24 formed integral with the horizontal flange 23. The vertical element 24 has a plurality of spaced openings 25, preferably three in number. Each of these openings is adapted to receive and accommodate an end 26 of the tire retaining member 16. This end 26 of the member 16 is curved upwardly, as best shown in Figures 2 and 3. Obviously, when the member is in a horizontal position with its end 26 disposed in one of the openings 25 in support 19, it will be effectively locked against lateral displacement from cooperation with the support 19. Vertical movement of the member 16 is prevented by the support 20, as will now be described in detail.

The support 20 comprises a fixed member 28 secured by bolts 29 to the running board 12, and a movable member 30 disposed in telescoping relation with the fixed member 28. The movable element 30 is provided with a threaded portion 31 adapted to be threaded into a vertical opening 32 formed in the fixed member 28. The threaded portion 31 (Figure 5) is provided with a vertical slot or groove 33, the purpose of which will be more fully explained hereinafter. The upper end of the threaded portion 31 has formed integral with it an enlarged head 34 including a hexagonally shaped top 35 adapted to be engaged by a wrench, whereby the element 30 may be screwed into the opening 32. The element 30 extends through an opening 36 formed in the enlarged end 37 of the tire retaining member 16. Obviously, when the tire retaining member 16 is in its locked or horizontal position shown in Figures 2 and 3, the enlarged head 34 of element 30 will be resting upon the enlarged end 37 of this member 16. Moreover, by threading the element 30 into the fixed element 28, it is possible to force the member 16 downwardly into clamping engagement with the tire rim 14, whereby shifting of the spare tire 15 will be prevented. This clamping action is permitted due to the fact that the bent end 26 is in reality hingedly connected to the support 19. That is to say, the member 16 is pivotally connected to the support 19, whereby it can be forced down into tight engagement with the outer face of the tire rim 14.

The fixed element 28 has formed integral with it a horizontal opening 38 disposed in communication with the threaded vertical opening 32. This opening 38 is adapted to receive a lock cylinder 40, which may be of any conventional construction. The lock cylinder 40 includes an eccentrically disposed pin 41 (Figures 5 and 6) having secured thereto a squared portion 42 disposed in opening 38 (Figure 6). This squared portion 42 has anchored to it an arm 43 including a lateral projection 44, adapted to extend into groove 33 of element 30. When the projection 44 is in the dotted position shown in Figure 5, the element 30 is unlocked from the fixed element 28, whereby it may be rotated to remove it from element 28. On the other hand, when the projection of the arm 43 is disposed in the groove 33 (Figure 5), the element 30 is locked against rotation in the fixed element 28.

The lock cylinder 40 is firmly secured to the fixed element 28 by means of a setscrew 48 extending through a passageway 49 (Figure 3) in the element 28. The head of the setscrew is disposed in an enlarged opening 50 communicating with passageway 49. Inasmuch as the head of the setscrew 48 is only accessible from the bottom of element 28, it necessarily follows that when the fixed element 28 is anchored to the running board by the bolts 29, the setscrew will be inaccessible.

From the foregoing it will be evident that the movable element 30 not only serves to lock the tire retaining member 16 against displacement, but it also serves as a means for forcing the member 16 into tight clamping engagement with the tire rim 14. When it is desired to remove the tire retaining member 16 from cooperation with the tire rim 14, the same may be accomplished by operating the lock to turn the projection 44 out of the groove 33 into the dotted position shown in Figure 5. Thereafter by engaging the hexagonal head 35 by a suitable wrench, the element 30 may be rotated out of the opening 32 in fixed element 28. After the element 30 has been removed from the enlarged end 37 of tire retaining member 16, this member 16 may be raised to remove its curved or bent end 26 out of one of the openings 25 in the support 19. By providing the support 19 with a plurality of openings 25, it is possible to use the tire retaining member 16 with different sizes of tires.

In Figure 8 I have shown a modified form of support 19' adapted to receive and support the tire retaining member 16 in a plurality of different positions. In this form of the invention, the adjustable feature is accomplished by means of a threaded connection rather than through the means of a plurality of openings, such as the openings 25. The support 19' comprises a fixed element 23' secured to the running board 12 of the vehicle by means of bolts 21'. This element 23' has a vertical threaded opening 25' adapted to accommodate the threaded movable element 24'. Formed integral with the upper end of the threaded element 24' is a head portion including an eyelet 28' adapted to receive and accommodate the curved or bent end 26 of the tire retaining member 16. It will be evident that with this form of support, it is possible to adjust it to a given or desired position prior to the insertion of the bent end 26 of the tire retaining member in the eyelet portion 28' thereof.

Now, of course, it is to be understood that although I have illustrated and described in detail the preferred forms of my invention, the invention is not to be thus limited, but only in so far as defined by the scope and spirit of the appended claims.

I claim as my invention:

1. In combination, in a spare tire lock construction, a plurality of spaced support members, a detachable tire retaining member connecting said members for transversely engaging the rim of the spare tire to be locked in a given position, one end of said member being insertable in an aperture in one of said supports, adjustable means carried by the other support for engaging the other end of said retaining member for holding said retaining member against displacement, and means carried by said latter support for locking said adjustable means to said support.

2. In combination, in a spare tire lock construction, a plurality of spaced support members, a detachable tire retaining member connecting said members adapted to engage the rim of the spare tire to be locked in a given position, one end of said member being insertable in an aperture in one of said supports, adjustable means carried by the other support for engaging the other end of said retaining member adapted to hold said retaining member against displacement, and means carried by said latter support for locking said adjustable means to said support, said tire retaining member including a downwardly projecting intermediate portion adapted to contact the tire rim, the portions of said member on the sides of said intermediate portion being formed to clear lateral projections on the sides of the tire rim.

3. In combination, in a spare tire lock construction, a plurality of spaced support members, a detachable tire retaining member connecting said members adapted to engage the rim of the spare tire to be locked in a given position, one end of said member being insertable in an aperture in one of said supports, adjustable means carried by the other support for engaging the other end of said retaining member adapted to hold said retaining member against displacement, and means carried by said latter support for locking said adjustable means to said support, said adjustable means including an element extending through an opening in the associated end of the retaining member and telescoping the associated support.

4. In combination, in a spare tire lock construction, a plurality of spaced support members, a detachable tire retaining member connecting said members adapted to engage the rim of the spare tire to be locked in a given position, one end of said member being insertable in an aperture in one of said supports, adjustable means carried by the other support for engaging the other end of said retaining member adapted to hold said retaining member against displacement, and means carried by said latter support for locking said adjustable means to said support, said adjustable means including a threaded element extending through an opening in the associated end of the retaining member and threaded into the associated support.

5. In combination, in a spare tire lock construction, a plurality of spaced support members, a detachable tire retaining member connecting said members adapted to engage the rim of the spare tire to be locked in a given position, one end of said member being insertable in an aperture in one of said supports, adjustable means carried by the other support for engaging the other end of said retaining member adapted to hold said retaining member against displacement, and means carried by said latter support for locking said adjustable means to said support, said adjustable means including a threaded element extending through an opening in the associated end of the retaining member and threaded into the associated support, said locking means including a member adapted to engage in a recess in said element to lock said element against rotation.

6. In combination, in a spare tire lock construction, a plurality of spaced support members, a detachable tire retaining member connecting said members adapted to engage the rim of the spare tire to be locked in a given position, one end of said member being insertable in an aperture in one of said supports, adjustable means carried by the other support for engaging the other end of said retaining member adapted to hold said retaining member against displacement, and means carried by said latter support for locking said adjustable means to said support, said tire retaining member being adapted to be carried in a plurality of different positions by said supports, thus enabling it to be adjusted to accommodate different sizes of tires, said adjustable means being adapted to force said tire retaining element into clamping engagement with the rim of the spare tire to prevent shifting of the spare tire.

7. In combination, in a spare tire lock construction, a plurality of independent support members mountable in spaced relationship, a tire retaining member connecting said members and extending transversely over the rim of the spare tire to be locked in a given position, one end of said member having pivotal connection with one of said support members and the other end being arranged to be locked to the other support member, and means for adjustably locking said latter end of the tire retaining member to said latter support member.

8. In combination, in a spare tire lock construction, a plurality of independent support members mountable in spaced relationship, a tire retaining member connecting said members and extending transversely over the rim of the spare tire to be locked in a given position, one end of said member having pivotal connection with one of said support members and the other end being arranged to be locked to the other support member, and means for locking said latter end of the tire retaining member to said latter support member, said tire retaining member including a projecting intermediate portion arranged to frictionally engage the inner surface of the rims carrying the spare tire.

In testimony whereof I have hereunto subscribed my name at Chicago, Cook County, Illinois.

OTTO F. SPEVAK.